March 22, 1938. C. J. SCHROEDER 2,111,813
VENT VALVE
Filed June 19, 1936 3 Sheets-Sheet 1
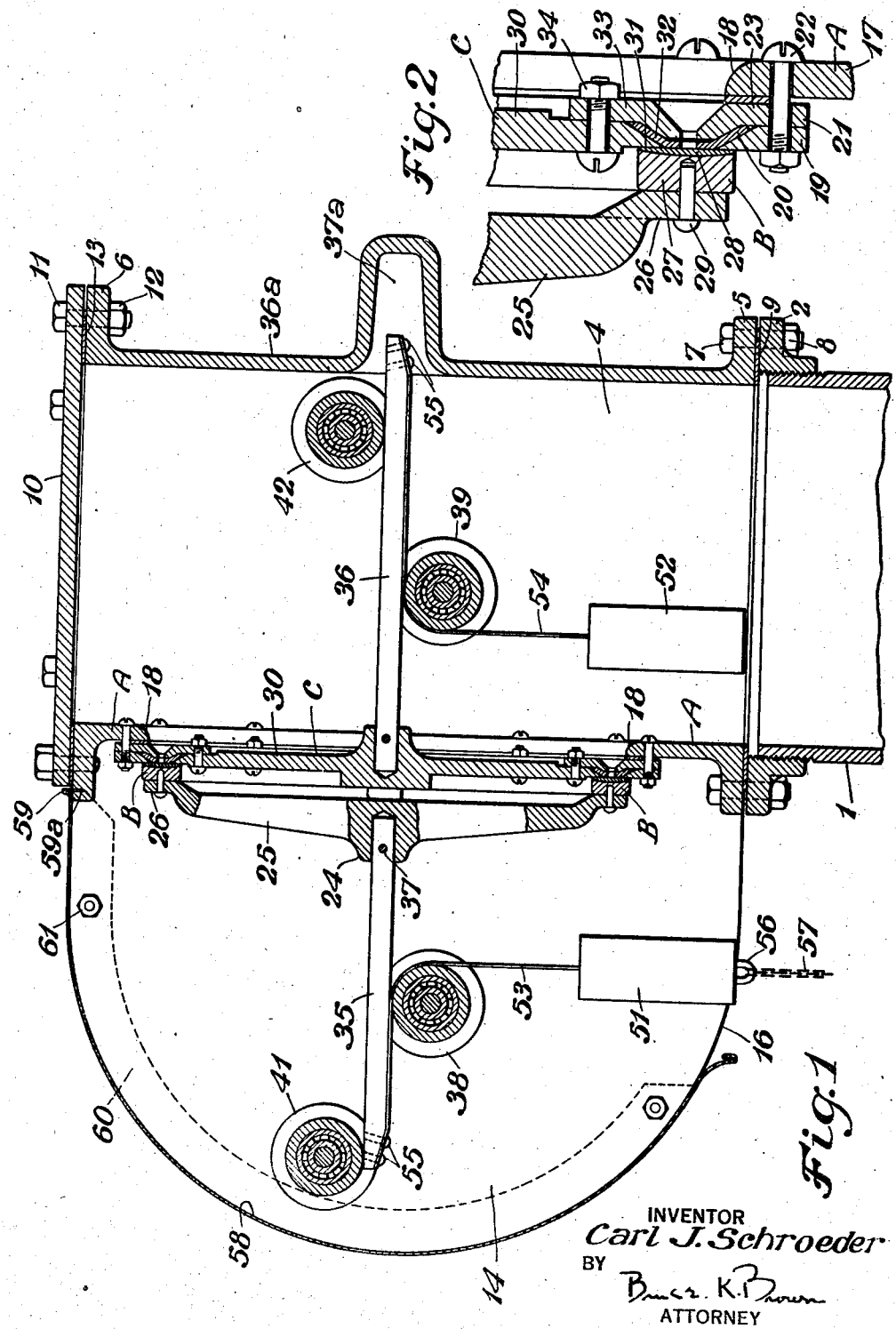
INVENTOR
Carl J. Schroeder
BY
ATTORNEY

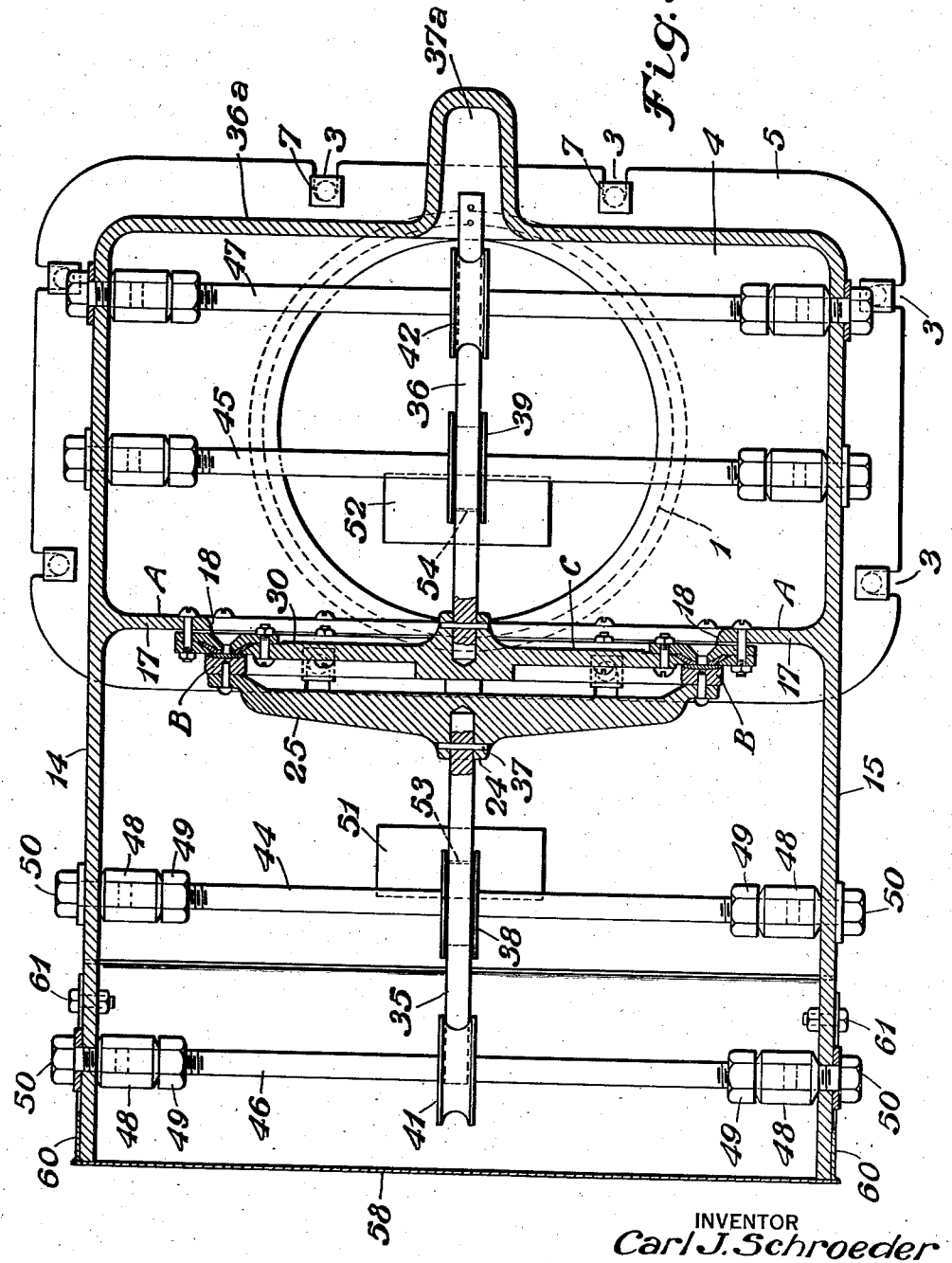

March 22, 1938.  C. J. SCHROEDER  2,111,813
VENT VALVE
Filed June 19, 1936   3 Sheets-Sheet 3
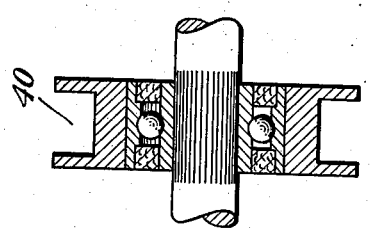
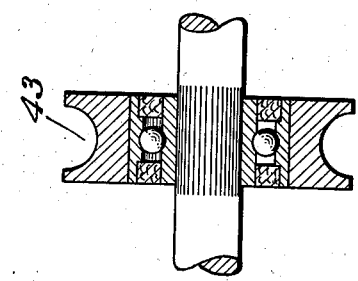
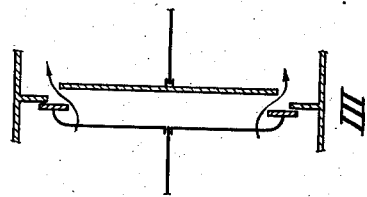
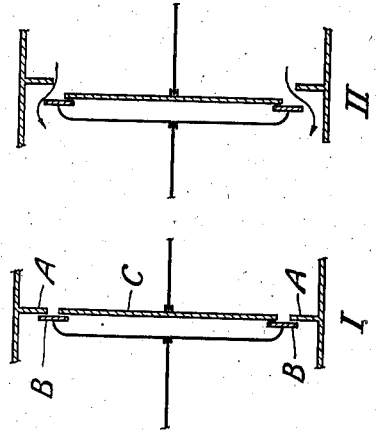
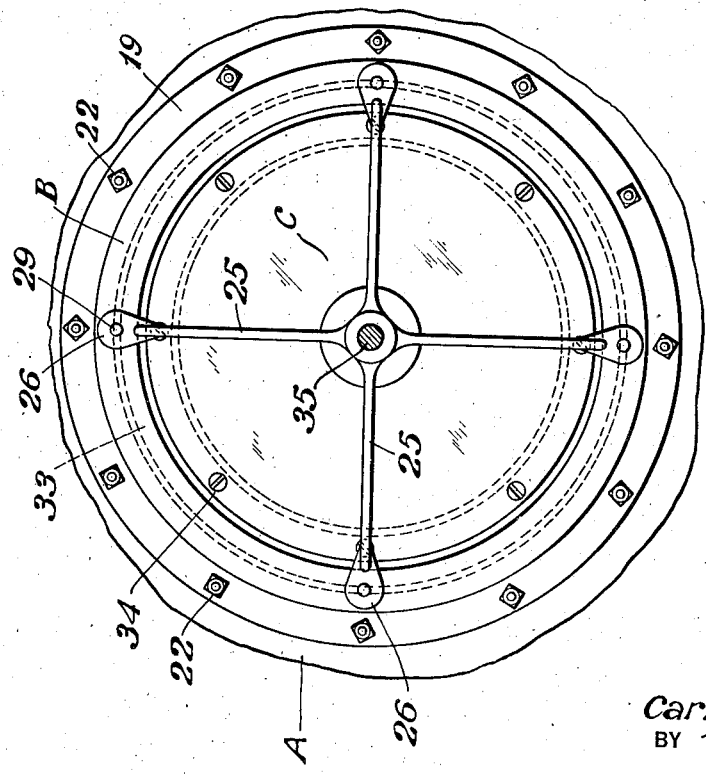
INVENTOR
Carl J. Schroeder
BY
ATTORNEY Patented Mar. 22, 1938

2,111,813

UNITED STATES PATENT OFFICE 2,111,813

VENT VALVE

Carl J. Schroeder, Hammond, Ind., assignor to Standard Oil Company, Chicago, Ill., a corporation of Indiana Application June 19, 1936, Serial No. 86,049

7 Claims. (Cl. 277—45)

This invention relates to vent valves and, in particular, to pressure-vacuum vent valves adapted for use on tanks for the storage of volatile fluids.

In the storage of volatile fluids such as hydrocarbon motor fuels in large storage tanks it is important that the tank be able to "breathe" during changes in pressure within the tank; that is, during the period of decreasing temperatures when the volume of fluid in the tank decreases, thereby producing a vacuum within the tank, means must be provided for permitting the ingress of air to prevent the collapse of the tank; and vice versa during the period of increasing temperature when the volume of fluid in the tank increases and/or the fluid in the tank is volatilized thereby creating a pressure within the tank, means must be provided for permitting excess vapors in the tank to escape to the atmosphere. Storage tanks of large volume tolerate comparatively small differences in pressure without danger of rupture or collapse. For this reason a pressure vacuum vent valve sensitive to small pressure differentials is desirable.

Pressure and vacuum vent valves of known types have seating surfaces which are not in a vertical plane and/or adjacent surfaces of substantial extent which are in a horizontal or near horizontal plane. This type of seat and surface adjacent thereto acts to accumulate foreign particles and to prevent accurate seating of the valve. Furthermore, these valves operate with friction guide members which are subject to wear and fouling. Still another disadvantage is that the vent valves heretofore used have separate valves or valve discs for vacuum and pressure relief which easily get out of alignment.

It is an object of this invention to provide a pressure-vacuum vent valve which may be adjusted to operate at any desired pressure and/or vacuum and which will seat properly at all times.

Another object of this invention is to provide a single disc vent valve possessing double action adapted for either pressure or vacuum operation.

It is another object of this invention to provide a pressure-vacuum vent valve assembly in which the valve seat and valve pallet are self aligning and the valve action substantially frictionless.

It is a further object of this invention to provide a pressure-vacuum vent valve assembly adapted to function with the seat in a substantially vertical plane.

Another object of this invention is to provide a pressure-vacuum vent valve assembly having a weather hood adapted to automatically spring open upon predetermined increase in temperature due to the ignition of the tank contents whereby the flames will be upwardly and outwardly directed away from the tank.

Other objects of this invention will become apparent from the following description thereof and the appended claims when read in conjunction with the accompanying drawings which form a part of this specification, and in which;

Fig. 1 is an assembly view with parts shown in vertical section;

Fig. 2 is an enlarged vertical section of a portion of the valve assembly showing the seating arrangement;

Fig. 3 is a plan view of the valve assembly partially in section;

Fig. 4 is an elevational view of a portion of the valve;

Fig. 5 is a detailed section of the upper roller assembly;

Fig. 6 is a detailed section of the lower roller assembly; and

Fig. 7—I—II—III are a diagrammatic illustration of the relative positions of the valve pallet, floating seat, and stationary seat, when the system is in equilibrium, under pressure, and under vacuum respectively.

Referring to Fig. 1 a volatile fluid storage tank (not shown) is provided with a riser 1 having a flanged top 2 provided with a plurality of slotted holes 3 (Fig. 3), said flanged top 2 being cast integral therewith or secured thereto by any suitable means. A valve body 4 having a flanged bottom portion 5 and a flanged top portion 6 is superposed upon riser 1 and secured thereto by means of bolts 7 and nuts 8 in aligned slotted holes 3 or by any other suitable securing means. A gasket 9 is interposed between the riser flange 2 and the bottom flange 5 of the valve body 4 to obtain a tight joint. The top of the valve body 4 is partially closed by a cover plate 10 removably secured to the top flange 6 by bolts 11 and nuts 12 or by any other suitable securing means, the remaining portion of the valve body being covered as hereinafter described. A gasket 13 is interposed between the cover plate 10 and the flange 6 to obtain a tight joint. The valve body 4 has a pair of opposing walls 14 and 15 (Fig. 3) extending substantially beyond the flanged portions 5 and 6 and having rounded ends 16 (Fig. 1).

The valve body 4 is provided with a vertical partition 17 having a circular opening 18—18 through which gases and/or air enter or leave the storage tank through the functioning of the vertical valve assembly which comprises a stationary valve seat assembly A, a floating valve seat assembly B and a valve pallet assembly C.

The stationary valve seat assembly A consists of a stationary valve seat ring 19 and a stationary annular valve seal insert 20 preferably of "Thiokol", a synthetic rubber-like material derived from olefin polysulfide, which is securely held in place by a stationary valve seal retaining ring 21 and secured to the vertical partition 17 about the periphery of the opening 18—18 by machine screws 22 or other suitable means. The stationary annular valve seal insert 20 is held securely in position by the stationary valve seat ring 19 being urged toward the stationary valve seal retaining ring 21 upon the tightening up of the machine screws 22. The free end of the stationary annular valve seal insert 20 extends slightly beyond the stationary valve seat ring 19 to form a leak-proof seal with the floating valve seat as hereinafter described. A gasket 23 is interposed between the stationary valve seal retaining ring 21 and the partition 17 to form a tight seal.

The floating valve seat assembly B consists of a spider 24 having a plurality of spider arms 25, preferably four in number, which have a flattened portion 26 at the extremity thereof. A floating valve seat ring 27 is secured to the flat portion 26 of each spider arm 25 with metallic drive screws 29 or other suitable means. The floating valve seat ring 27 is provided with a hardened face 28, preferably formed by welding "Stellite" into a suitable recess formed in the floating valve seat ring 27 and thereafter surface-ground to provide an exceedingly hard, smooth, and corrosion resistant valve seat, against which seat the stationary valve seat ring 19 and the stationary valve seal insert 20.

"Stellite" is the name given certain alloys of cobalt, a typical composition being cobalt 65%, chromium 30%, tungsten 4%, carbon .75% and iron .25%.

The valve pallet assembly consists of a valve pallet 30 and a seating surface 31 at the periphery thereof adapted to fit upon a portion of the hardened face 28 of the floating valve seat ring 27. An annular valve seal insert 32 preferably of "Thiokol" and securely held in position by a valve seal retaining ring 33 secured to the valve pallet 30 by screws 34, or other suitable fastening means, extends slightly beyond the periphery of the valve pallet seating surface 31 to form a leak-proof seal against the floating valve seat ring 27.

I prefer the combination of a "Stellite" seat and a "Thiokol" seal for use in effecting a tight valve seal because "Thiokol" is unaffected by hydrocarbon vapors and remains flexible and pliant during long usage, and "Stellite" resists corrosion and possesses unusual hardness and is therefore not readily scored or worn away by prolonged use. It should be understood, however, that while I have herein specified particular materials for the valve seal and for the valve seat, other materials having similar properties may be employed.

The floating valve seat assembly B and the valve pallet assembly C float independently on the ends of two separate horizontal spindles which are adapted to move in a horizontal direction without substantial friction on grooved rollers and are urged to a closed contacting position by means of weights attached to the spindles and trained over the rollers by means of a chain or flexible tape as hereinafter described.

The spider 24 and the valve pallet 30 are secured substantially perpendicularly to the spider spindle 35 and the valve pallet spindle 36 respectively which fit loosely in the hubs thereof and are secured thereto by cotter pins 37 or other suitable securing means. The spindles 35 and 36 move in a reciprocating horizontal direction upon the ball bearings or other suitable substantially frictionless bearings 38 and 39 respectively, each of which is provided with a flat groove 40 (Fig. 6), and are guided and restrained in a horizontal position by ball bearing rollers or other suitable substantially frictionless bearings 41 and 42 respectively, each of which is provided with a round groove 43 (Fig. 5) having substantially the same curvature as the spindles 35 and 36. The wall 36a of the valve body 4 is provided with a recess 37a to receive the spindle 36 as it reciprocates in a horizontal direction.

Ball bearing rollers 38 and 39 and ball bearing rollers 41 and 42 are mounted upon shafts 44 and 45 and 46 and 47 respectively, which are supported by the side walls 14 and 15 of the valve body 4 and securely held in position by nuts 48 and set nut 49 and cap screw 50 (Fig. 3).

The floating valve seat assembly B is urged against the stationary valve seat assembly A, and the valve pallet assembly C is urged against the floating valve seat assembly B by counterweights 51 and 52 respectively, suspended from flexible tapes 53 and 54 respectively trained over rollers 38 and 39 in groove 40 of each roller (Fig. 6) and secured to the free ends of spindles 35 and 36 by metallic drive screws 55 or other suitable securing means. Counterweights 51 and 52, which are of such weight as normally to maintain the valves in the closed position, are preferably made of a steel shell filled with lead or other suitable weighing material to give the desired weight. The relative weights of counterweights 51 and 52 determine the operating pressures of the valve assembly; for example the valve will operate with a 1-ounce vacuum and a 1-ounce pressure if the counterweights 51 and 52 weigh respectively 10 lbs. and 5 lbs.

The bottom of counterweight 51 is provided with an eye 56 to which is attached a flame snuffer chain 57 which is used to manually urge the floating valve assembly B to a closing position for the purpose of snuffing out any flame caused by the ignition of the vapors within the tank.

The valve seats and valve operating mechanism are protected from the weather by a weatherhood 58 fabricated of suitable metal and attached to the valve body in the following manner: Arcuated strips 60, suitably fabricated of the same material as the weatherhood 58, having substantially the same curvature as the rounded portion 16 of walls 14 and 15 are secured by bolts 61 or other suitable securing means to the inner surfaces of walls 14 and 15 and extend about three-fourths of the distance around the rounded portion 16 thereof. The sheet metal weatherhood 58, without preshaping, is soldered to a flanged edge 59 secured in the slot 59a in the top portion 6 of the valve body 4, and after being sprung to conform with the curvature of strips 60 is soldered thereto. By springing the hood sheet into position without preshaping the same, the weatherhood sheet is put under a tension which causes it to spring open when the solder holding the sheet is melted by a substantial increase in temperature such as would be caused by a fire at or near the vent valve. When the hood sheet springs open in case of fire at the vent valve, the flames are thereby permitted to escape upwardly and outwardly away from the tank, thereby avoiding damage to the tank and vent valve.

The operation of the pressure vacuum vent valve described in detail in the foregoing is as follows: When the system is in equilibrium the relative position of the valve pallet, floating seat, and stationary seat is as shown in Fig. 7—I; the floating valve seat assembly B is seated against the stationary valve seat assembly A and the valve pallet assembly C is seated against the floating valve seat assembly B thereby closing the valve port and preventing the introduction of air into the tank and the escape of air and/or vapors from the tank. When the tank is under excess pressure the relative position of the valve pallet, floating seat, and stationary seat is as shown in Fig. 7—II. The pressure in the tank forces the valve pallet assembly C against the floating valve seat assembly B thereby forcing the latter away from the stationary valve seat assembly A moving the spindle 35 to the left and raising the weight 51, permitting the vapors to escape from the tank as shown by the arrows. As the pressure in the tank diminishes the weight 51 will gradually descend to its normal position causing the floating valve seat assembly B to return to its normal position and thereby returning the valve pallet assembly to its normal position as shown in Fig. 7—I. When the pressure within the tank becomes less than the atmospheric pressure, i. e., when a vacuum is created within the tank, the atmospheric pressure will force the valve pallet assembly C away from the floating valve seat assembly B moving the spindle 36 to the right thereby raising weight 52 and permitting air to enter the tank as shown in Fig. 7—III. When the pressure again reaches equilibrium the weight 52 will descend and thereby return the valve pallet assembly C to its normal position as shown in Fig. 7—I. Thus I have provided a single disc-breather valve possessing double action to handle either pressure or vacuum in excess of a predetermined quantity.

By providing a pressure-vacuum vent valve seating in a vertical plane, dirt, snow and other foreign matter is prevented from collecting at or near the seat or from lodging on the seat at the moment the flow of gases stops.

Where it is desired to increase the venting capacity for a tank beyond that provided by a single vent valve, another similar vent valve may be placed directly on top of the existing vent valve, to be attached in place of the present cover plate 10, which would then be used for closing the top opening of the upper vent valve. Such an arrangement permits approximately doubling the venting capacity through a single tank connection, which is not feasible with other vent valves.

I have described in detail a preferred embodiment of this invention, for the purpose of illustration only and not as limiting the scope of the invention which is to be defined by the following claims, which should be construed as broadly as the prior art will permit.

I claim:

1. In combination in a pressure and vacuum vent valve, a port comprising a stationary seat lying in a substantially vertical plane, a movable seat adapted to engage said stationary seat, a valve pallet adapted to engage said movable seat, antifriction supporting and guiding means for said movable seat, separate independent antifriction supporting and guiding means for said valve pallet and urging means for urging said movable seat into engagement with said stationary seat and said valve into engagement with said movable seat.

2. In combination in a pressure and vacuum vent valve, a floating valve seat assembly, a stationary valve seat assembly, a valve pallet assembly, horizontal guiding means substantially perpendicular to and associated with said floating valve seat assembly, a second horizontal guiding means substantially perpendicular to and associated with said valve pallet assembly, a plurality of antifriction bearing means associated with said guiding means and counterweighting means associated with said guiding means.

3. In a pressure and vacuum vent relief valve, a port having a stationary vertical seating face thereon, a movable annular ring having a vertical seating face thereon the outer portion of which engages said stationary face, a valve pallet having a vertical face adjacent its outer periphery engaging the inner portion of said movable face, antifriction supporting and guiding means extending from said movable annular ring in a first direction, separate antifriction supporting and guiding means extending from said valve in a direction opposite in sense to said first direction and urging means for urging said movable annular ring into engagement with said stationary vertical seating face and said valve pallet into engagement with the vertical face of said movable annular seating ring.

4. In combination in a vent valve, a valve body, a port vertically disposed in said valve body, a stationary valve seat disposed about the periphery of said port, a floating valve seat vertically disposed in said valve body in contacting relation with said stationary valve seat, a valve pallet assembly disposed in said port and in contacting relation with said floating valve seat, a horizontal spindle associated with said floating valve seat assembly, a second horizontal spindle associated with said valve pallet assembly, a plurality of antifriction rotatable supporting means, said supporting means supporting said horizontal spindles associated with said floating valve seat assembly and valve pallet assembly, and counterweighting means associated with each of said spindles.

5. In combination in a pressure and vacuum vent valve, a valve casing, a port vertically disposed within the valve casing, a stationary valve seat ring disposed about the periphery of said port, a flexible valve seal member associated with said stationary valve seat ring, a valve seal retaining ring associated with said stationary valve seat ring and said valve seal, a spider vertically disposed within said valve casing, a valve seat ring associated with said spider, said valve seat ring adapted to normally contact said stationary valve seat ring and said valve seal, a valve pallet vertically disposed in said port, a second flexible valve seal member associated with said valve pallet, a second valve seal retaining ring associated with said valve pallet and said second valve seal, a horizontally disposed spindle associated with said spider, a second horizontally disposed spindle associated with said valve pallet, a plurality of ball bearing rollers, said ball bearing rollers supporting said spindles, counterweighting means associated with each of said spindles and manual valve closing means associated with said counterweighting means associated with said spider spindle.

6. In combination in a vent valve, a valve body, a port vertically disposed in said valve body, a stationary valve seat disposed about the periphery of said port, a floating valve seat vertically disposed in said valve body in contacting relation with said stationary valve seat, a valve pallet assembly disposed in said port and in contacting relation with said floating valve seat, a horizontal spindle associated with said valve seat, a second horizontal spindle associated with said valve pallet, a plurality of antifriction rotatable supporting means, said supporting means supporting said horizontal spindles associated with said floating valve seat and valve pallet, counterweighting means associated with each of said spindles, and valve protecting means, said protecting means comprising a sprung metallic covering fusibly attached to said valve body.

7. In combination in a pressure and vacuum vent valve, a valve casing, a port vertically disposed within the valve casing, a stationary valve seat ring disposed about the periphery of said port, a flexible valve seal member associated with said stationary valve seat ring, a valve seal retaining ring associated with said stationary valve seat ring and said valve seal, a spider vertically disposed within said valve casing, a valve seat associated with said spider, said valve seat adapted to normally contact said stationary valve seat ring and said valve seal, a valve pallet vertically disposed in said port, a second flexible valve seal member associated with said valve pallet, a second valve seal retaining ring associated with said valve pallet and said second valve seal, a horizontally disposed spindle associated with said spider, a second horizontally disposed spindle associated with said valve pallet, a plurality of ball bearing rollers, said ball bearing rollers supporting said spindles, a plurality of ball bearing rollers superjacent first mentioned ball bearing rollers, said first mentioned ball bearing rollers and said second mentioned ball bearing rollers maintaining said spindles in a substantially horizontal plane, and counterweighting means associated with each of said spindles and manual valve closing means associated with said counterweighting means associated with said spider spindle.

CARL J. SCHROEDER.